United States Patent
Heinrich et al.

(10) Patent No.: US 7,431,747 B2
(45) Date of Patent: Oct. 7, 2008

(54) CUTTING TOOL AND METHOD OF REDUCING THE WIDTH OF WEAR MARK ON A CUTTING TOOL

(75) Inventors: Hans-Wilm Heinrich, Dresden (DE); Günter Roder, Mistelgau (DE); Günther Häupl, Bayreuth (DE)

(73) Assignee: Kennametal Inc., Latrobe, PA (US)

( * ) Notice: Subject to any disclaimer, the term of this patent is extended or adjusted under 35 U.S.C. 154(b) by 150 days.

(21) Appl. No.: 11/330,856

(22) Filed: Jan. 12, 2006

(65) Prior Publication Data

US 2006/0194078 A1 Aug. 31, 2006

Related U.S. Application Data

(63) Continuation of application No. PCT/EP2004/007381, filed on Jul. 6, 2004.

(30) Foreign Application Priority Data

Jul. 15, 2003 (DE) ............... 103 32 101

(51) Int. Cl.
*B32B 9/00* (2006.01)
(52) U.S. Cl. ............ 51/307; 51/309; 407/119; 427/348; 427/355; 427/419.1; 427/419.2; 427/419.7; 428/212; 428/698; 428/701; 428/702
(58) Field of Classification Search ............ 51/307, 51/309; 407/119; 428/212, 698, 701, 702; 427/348, 355, 368, 419.1, 419.2, 419.7
See application file for complete search history.

(56) References Cited

U.S. PATENT DOCUMENTS 4,643,620 A * 2/1987 Fujii et al. ............ 407/119

| | | |
|---|---|---|
| 5,558,922 A | 9/1996 | Gupta et al. |
| 5,776,588 A | 7/1998 | Toshio et al. |
| 6,062,776 A * | 5/2000 | Sandman et al. ............ 428/216 |
| 2002/0187370 A1 * | 12/2002 | Yamagata et al. ........... 428/701 |

FOREIGN PATENT DOCUMENTS

DE 30 20 929 A1 12/1981
EP 0 693 574 A1 1/1996

(Continued)

OTHER PUBLICATIONS

International Search Report for PCT/EP2004/007381 mailed Nov. 18, 2004 (3 pages).

*Primary Examiner*—Archene Turner
(74) *Attorney, Agent, or Firm*—John J. Prizzi

(57) ABSTRACT

The invention relates to a cutting tool made of ceramics, cermet or cemented carbide and including a rake face, a flank face and a cutting edge at the intersection of rake face and flank face, as well as a multi-layered wear resisting coating including a layer which is made of aluminum oxide and deposited on a hard material layer, in which for avoiding an increase in the width of wear mark, with simultaneous retention of the resistance to cratering of the rake face, the aluminum oxide layer of the coating is removed on the flank face and the underlying hard material layer is exposed at least in portions. The aluminum oxide layer of the coating is removed on the flank face preferably by means of laser beam treatment.

16 Claims, 2 Drawing Sheets

FOREIGN PATENT DOCUMENTS

Figure 3:
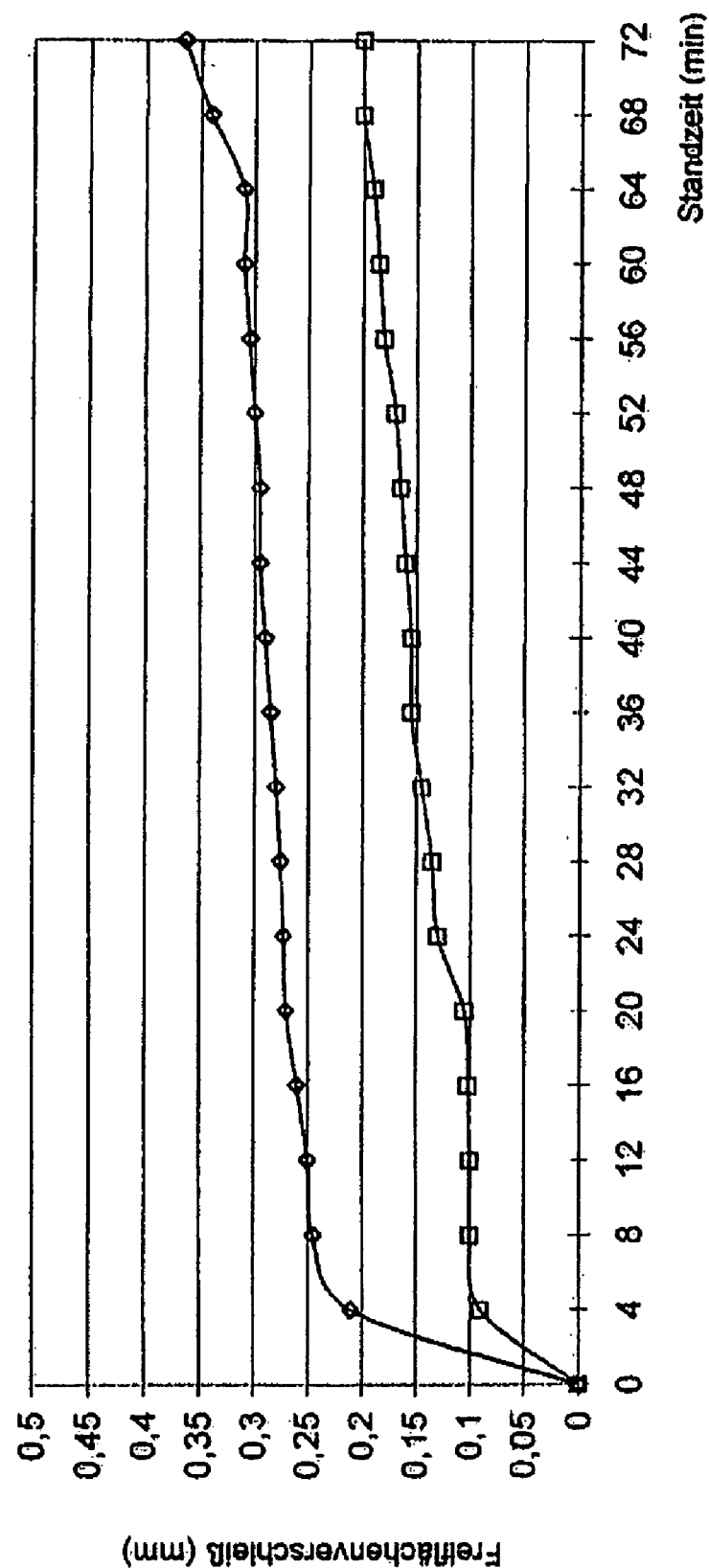

| | | |
|---|---|---|
| EP | 0 908 259 A2 | 4/1999 |
| EP | 1 036 618 A2 | 9/2000 |
| EP | 0 908 259 A3 | 1/2003 |
| EP | 1 455 003 A2 | 9/2004 |
| JP | 08-150502 * | 6/1996 |
| WO | WO 90/11156 | 10/1990 |

* cited by examiner

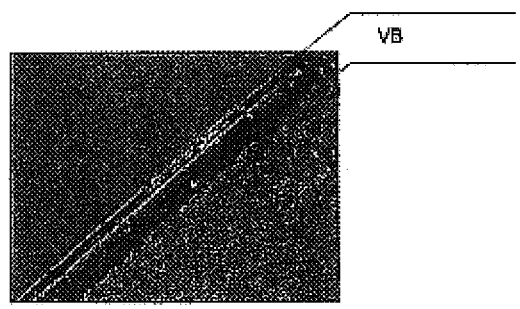
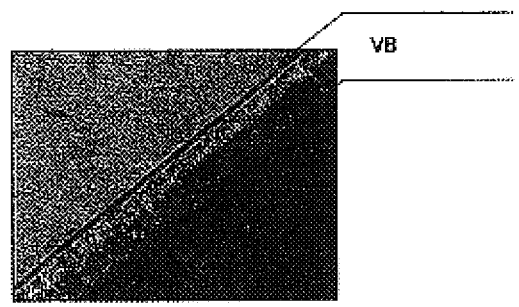
Fig. 1A  Fig. 1B
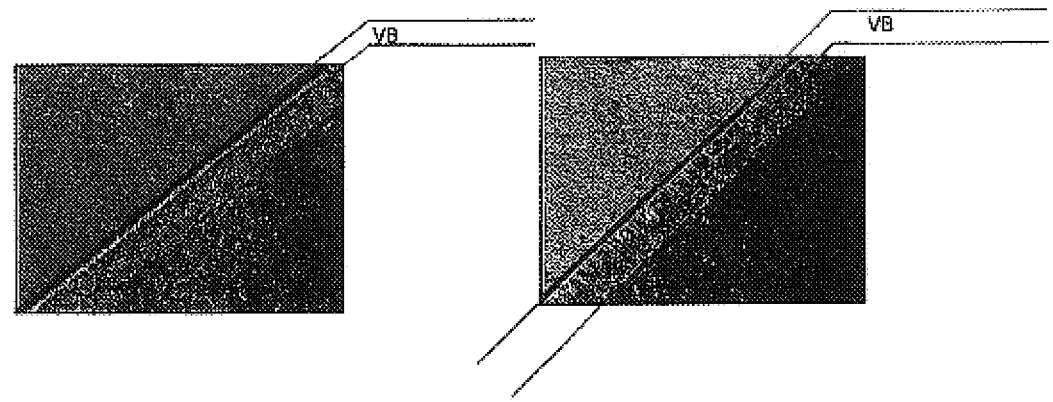
Fig. 2A  Fig. 2B

CUTTING TOOL AND METHOD OF REDUCING THE WIDTH OF WEAR MARK ON A CUTTING TOOL

CONTINUING PATENT APPLICATION DATA

This patent application is a Continuation patent application of International Patent Application PCT/EP2004/007381 filed on 6 Jul. 2004, which claims priority from Federal Republic of Germany Patent Application No. 103 32 101.2 filed on 15 Jul. 2003. International Patent Application PCT/EP2004/007381 was pending as of the filing date of this patent application. The United States of America was an elected state in International Patent Application PCT/EP2004/007381.

The invention relates to cutting tools made of ceramics, cermet or cemented carbide such as, for example, cutting inserts, indexable cutting inserts, solid cemented carbide drills, -milling cutters, -chipping chisels and the like, which are used for metal machining and comprise a rake face, a flank face and a cutting edge at the intersection of rake face and flank face, as well as a multi-layered wear resisting coating. The coating comprises at least one layer made of aluminum oxide, for improving the resistance to cratering of the rake face and for reducing the formation of built-up edges. For its part, the aluminum oxide layer of the coating is deposited preferably by chemical or physical vapor deposition on one or more hard material layers, which give the cutting tool the required hardness.

Cutting tools comprising such multi-layered wear resisting coatings are known from EP-B1-0 463 000. A preferred layer structure, for the wear resisting coating, which is described there, is comprised of a base layer of titanium carbonitride in a thickness of 5 to 8 μm, and three aluminum oxide layers in a thickness of 0.5 to 1.5 μm which are deposited successively above the base layer, with a thin, 0.2 to 1 μm thick titanium nitride layer being provided between the individual aluminum oxide layers, for improving the adherence of the layers. For reducing the surface function and the formation of built-up edges, the uppermost aluminum oxide layer is provided with a covering layer which is made solely from titanium nitride or from a combination of titanium nitride and titanium carbonitride.

Due to reasons regarding production and costs, the multi-layered, wear resisting coatings hitherto have been deposited uniformly on all surface areas of the cutting tools. As it is inevitable that the stresses on rake face and flank face of a cutting tool of this type are very different, the advantageous properties of specific coating layers produce an effect only on one of the two surface areas, whereas they turn out to be of disadvantage on the other surface area.

It is through the chips flowing off only on the rake face that recessed "craters" are formed at a certain distance behind the cutting edge, which drastically reduce the mechanical strength of the cutting tool and finally lead to rupture. In order to slow down this cratering process, the hard coatings are provided with aluminum oxide layers.

On the flank face, however, the lower hardness of the aluminum oxide layer in comparison to the harder coating layers that preferably consist of TiCN, TiC and/or TiN, leads to an enhanced growth of the width of wear mark below the cutting edge and, hence, to a larger width of wear mark, as seen for a defined action time.

In order to find a compromise between these advantages and disadvantages of the aluminum oxide layer in the coating, an additional, hard layer of TiCN/TiN has been applied onto the uppermost aluminum oxide layer. It was inevitable that a certain impairment to the positive effects of the aluminum oxide layer on the rake face had to be accepted here.

Using titanium nitride as the uppermost layer of the coating also has an aesthetic effect in terms of sales promotion, because such layer will develop a brass-like or golden shine; aluminum oxide layers, on the other hand, are gray or black.

Cutting tools are already commercially available in which the uppermost TiCN/TiN-layers deposited above an aluminum oxide layer of the coating have been mechanically removed subsequently, in order to fully maintain the advantageous effects of aluminum oxide on the rake face in terms of resistance to cratering and formation of built-up edges. Through the mechanical removal of the uppermost layers above the aluminum oxide, however, the disadvantages of the aluminum oxide on the flank face are not eliminated.

The invention therefore is based on the object to provide cutting tools of the type initially mentioned, in which the advantages of the aluminum oxide layers in the coating will have their proper effect, at the same time an increase in the width of wear mark on the flank face being avoided.

The invention is further based on the object to propose an economic method, capable of being automated, of reducing the width of wear mark on a cutting tool of the type mentioned.

This object is solved according to the invention by a cutting tool having the features of claim 1, which is distinguished in that the aluminum oxide layer of the coating is removed on the flank face, so that the underlying hard material layer is exposed at least in portions, and by a method having the features of claim 7, which is distinguished in that the aluminum oxide layer of the coating, optionally together with the further superimposed layer(s), is/are removed at least in portions only on the flank face and, in so doing, the underlying hard material layer, preferably consisting of titanium carbonitride or titanium nitride, is exposed.

Advantageous embodiments of the cutting tool according to the invention are characterized by the features of claim 2 to 6, advantageous embodiments of the method according to the invention are characterized by the features of claim 8 to 13.

The hard material layer that is exposed by the removal of the aluminum oxide may consist of a carbide, nitride, carbonitride, oxide or boride of the metals Ti, Zr, Hf, V, Nb, Ta, Cr, Mo or W; the hard material layers of the wear resisting coatings are preferably made of TiN or TiCN, however.

In case the uppermost layer of the wear resisting coating is made of aluminum oxide, only this layer will be removed according to the invention on the flank face; in case the uppermost aluminum oxide layer, however, is additionally coated with one or more further hard material layers, the uppermost aluminum oxide layer together with the superimposed layers will be removed on the flank face. These superimposed layers likewise may be made of a carbide, nitride, carbonitride, oxide or boride of the metals from the groups IVB, VB and VIB of the periodic system of elements. The removal can be effected mechanically, for example by brushing or polishing or grinding, it can be done by means of a fluid jet through dry or wet blasting, or by a combination of dry and wet blasting, or it can be done by means of laser beam treatment which is particularly preferred.

In the mode given last, the flank face or a part of the flank face is scanned with a laser beam until the hard material layer present underneath the aluminum oxide layer is exposed in the desired portion of the flank face.

In the process, the width of the laser beam is of minor importance. If the line width of the laser beam is only approximately 150 to 200 μm and the flank face has a length of between 6 and 30 mm, then the laser equipment will need only about 0.1 seconds to scan one line across the full length of the flank face. If the laser beam scans 2 to 30 lines in a program-controlled manner, then 0.2 to 3 seconds are needed for treating a commercially available indexable cutting insert.

Although the treated surface area, from which the aluminum oxide layer of the coating will be removed, extends preferably in parallelism to a cutting edge, it is easily possible with the aid of a program-controlled laser guidance to configure the area, freed from aluminum oxide, of the flank face in the form of an arbitrarily shaped pattern or design.

The advantages of the laser treatment were surprising for the person of skill in the art, because it was not expected that the aluminum oxide layer chips off from the surface of the underlying hard material layer more or less on the full surface area and, hence, can be detached without damaging the underlying layers or change them to a substantial extent. The regions for this are supposed to be found in the different coefficients of thermal conduction and/or in the different coefficients of thermal expansion of the deposited layers.

For this reason it is also made possible to apply the method according to the invention with coatings that have several aluminum oxide layers separated from each other by interposed hard material layers.

The area of the flank face from which the aluminum oxide layer will be detached according to the invention, can be of varying sizes and widths. It preferably includes the associated cutting edge, but without to touch on the rake face on the other side of the cutting edge. The area may include a strip having a width of up to 1 mm, but especially in the case of indexable cutting inserts it can also include the whole flank face which extends between two or more cutting edges.

As a termination edge can be formed at the transition from the portion of the coating that has undergone laser treatment to the portion of the coating without laser treatment, when the aluminum oxide layer is removed from a defined area of the flank face, such termination edge can be dressed, rounded or smoothed by a blast treatment, polishing or brushing.

The advantages achieved by the invention in terms of reducing the width of wear mark on the flank face of cemented carbide cutting bodies have been verified by rotary abrasion tests on conventional cutting tools and on cutting tools according to the invention. The results are explained with the aid of the accompanying photographs and drawings:

FIGS. 1A, B are photographs, on an enlarged scale of 1:60, of flank faces of a conventional cutting body prior art), that show the width of wear mark after 10 and 100 transverse turning cycles, respectively;

FIGS. 2A, B are photographs, on an enlarged scale of 1:60, of flank faces of a cutting body according to the invention, that show the width of wear mark after 10 and 100 transverse turning cycles, respectively;

FIG. 3 is a diagram that shows the wear of the flank face versus durability, both for the known cutting bodies and the cutting bodies according to the invention.

ROTARY WEAR TEST

A lathe chisel was equipped with cemented carbide cutting inserts of the type CNMA 120408 which had a core of cemented carbide P20 and a wear resisting multi-layer coating with following layer sequence (from inside to outside): 0.5 µm TiN, 8 µm MT-TiCN, 1 µm HT-TiCN, 8 µm $Al_2O_3$. On some of the cutting inserts the aluminum oxide layer of the coating was removed according to the invention by laser treatment on the flank face, whereby the underlying TiCN layer was exposed. On the other part of the cutting inserts the coating was left unchanged (conventional inserts).

A work piece of chromium steel 100Cr6 (1.2067) was machined with the lathe chisel equipped in such manner under the following conditions:

| | |
|---|---|
| cutting speed | 200 m/min |
| feed | 0.2 mm/U |
| depth of cut | 0.2 mm |
| outer turning diameter | 198 mm |
| inner turning diameter | 100 mm |
| cooling | emulsion 5% |
| set angle | 95° |

After 10 transverse turning cycles (FIG. 1A), the conventional cutting inserts showed a wear mark (VB) on the flank face of 0.185 mm in width. After 100 transverse turning cycles (FIG. 1B) the wear mark had already grown to a width of 0.240 mm.

The laser-treated cutting inserts according to the invention showed after 10 transverse turning cycles (FIG. 2A) a wear mark (VB) of 0.080 mm in width, after 100 transverse turning cycles (FIG. 2B) the wear mark had grown to a width of 0.140 mm. The area of the flank face from which the aluminum oxide layer was removed is referenced by X in FIG. 2B.

This distinct reduction in the width of wear mark, correlating to a corresponding extension of the service life (durability) of the tool, can be attributed to the removal, according to the invention, of the aluminum oxide layer of the coating on the flank face.

On the other hand, another set of cutting bodies of cemented carbide P10 of the type CNMG 120408 MN was produced in a conventional manner and provided with a wear resisting multi-layer coating having a layer stricture as follows (from inside to outside): 0.5 µm TiN, 15 µm MT-TiCN, 1 µm HT-TiCN, 8 µm $Al_2O_3$. Some of the cutting inserts were left in such condition (conventional cutting bodies), on another part the aluminum oxide layer of the coating was removed on the flank face by laser treatment.

A work piece of steel of the type 42CrMo4 (1.7225) was machined on a lathe using the conventional cutting bodies and the cutting bodies treated according to the invention, under the following conditions:

| | |
|---|---|
| cutting speed | 180 m/min |
| feed | 0.3 mm/U |
| depth of cut | 2.5 mm |
| set angle | 95° |
| cooling | emulsion 5%. |

The flank face wear was measured and plotted versus the durability of the tool. FIG. 3 shows the resultant graphs for the cutting bodies according to the invention (lower curve with square dots) and for the cutting bodies left conventional (upper curve with rhombic dots).

As can be directly taken from FIG. 3, the flank face wear with a durability of 20 minutes amounts with a cutting insert according to the invention approximately to 0.1 mm, with a conventional cutting insert approximately to 0.27 mm. Having a durability of 60 minutes, a flank face wear of approximately 0.31 mm is observed on a conventional insert, on an insert according to the invention only 0.18 mm, however.

The invention claimed is:

1. A cutting tool made of ceramics, cermet or cemented carbide and comprising a rake face, a flank face and a cutting edge at the intersection of rake face and flank face, as well as a multi-layered wear resisting coating including a layer which is made of aluminum oxide and deposited on a hard material layer, characterized in that the aluminum oxide layer of the coating is removed from at least a portion of the flank face, so that the underlying hard material layer is exposed on at least a portion of the flank face, and the aluminum oxide layer not being removed from the rake face.

2. The cutting tool according to claim 1, characterized in that the coating comprises one or more layers deposited over the aluminum oxide layer, and that this/these further layer(s) is/are removed together with the aluminum oxide layer.

3. The cutting tool according to claim 2, characterized in that at least portions of the aluminum oxide layer of the coating are removed only on the flank face.

4. The cutting tool according to claim 2, characterized in that the aluminum oxide layer of the coating is removed on the flank face in a portion where the associated cutting edge(s) is/are included.

5. The cutting tool according to claim 4, characterized in that the portion extends in parallelism to a cutting edge.

6. The cutting tool according to claim 2, characterized in that the exposed hard material layer and/or the at least one further layer above the aluminum oxide layer is a carbide, nitride, carbonitride, oxide or boride of a 7. The cuffing tool according to claim 1, characterized in that at least portions of the aluminum oxide layer of the coating are removed only on the flank face. metal from the groups IVB, VB or VIB of the periodic system of elements.

8. A method of reducing the width of wear mark on a cutting tool made of ceramics, cermet or cemented carbide and comprising a rake face, a flank face and a cutting edge at the intersection of rake face and flank face, as well as a multi-layered wear resisting coating including a layer which is made of aluminum oxide and deposited on a hard material layer and, optionally, the aluminum oxide layer being coated with one or more further superimposed layer(s), characterized in that the aluminum oxide layer of the coating, optionally together with the further superimposed layer(s), is/are removed from at least a portion on the flank face and, in so doing, the underlying hard material layer is exposed, and the aluminum oxide layer not being removed from the rake face.

9. The method according to claim 8, characterized in that the removal of the aluminum oxide layer and optionally of the further superimposed layer(s) is effected mechanically.

10. The method according to claim 8, characterized in that the removal of the aluminum oxide layer and optionally of the further superimposed layer(s) is effected by means of a fluid jet.

11. The method according to claim 8, characterized in that the removal of the aluminum oxide layer and optionally of the further superimposed layer(s) is effected by means of laser beam treatment.

12. The method according to claim 11, characterized in that the aluminum oxide layer and optionally the further superimposed layer(s) of the coating is removed only on the flank face in that the flank face or parts thereof are scanned with a laser beam until the hard material layer provided underneath the aluminum oxide layer is exposed in the desired portion of the flank face.

13. The method according to claim 12, characterized in that a termination edge, that is formed at the transition from the portion of the coating that has undergone laser treatment to the portion of the coating without laser treatment, is dressed, rounded or smoothed by a blast treatment, by polishing or brushing.

14. The method according to claim 12, characterized in that the exposed hard material layer and/or the at least one further layer above the aluminum oxide layer is a carbide, nitride, carbonitride, oxide or boride of a metal from the groups IVB, VB or VIB of the periodic system of elements.

15. The method according to claim 8, characterized in that the exposed hard material layer is a carbide, nitride, carbonitride, oxide or boride of a metal from the groups IVB, VB or VIB of the periodic system of elements.

16. The method according to claim 8, characterized in that at one of the further superimposed layers is a carbide, nitride, carbon itride, oxide or boride of a metal from the groups IVB, VB or VIB of the periodic system of elements.

* * * * *